G. W. BOLDREY & G. R. HUSSUNG.
LOADING AND DUMPING APPARATUS.
APPLICATION FILED DEC. 10, 1909.
978,817.
Patented Dec. 13, 1910.
2 SHEETS—SHEET 1.
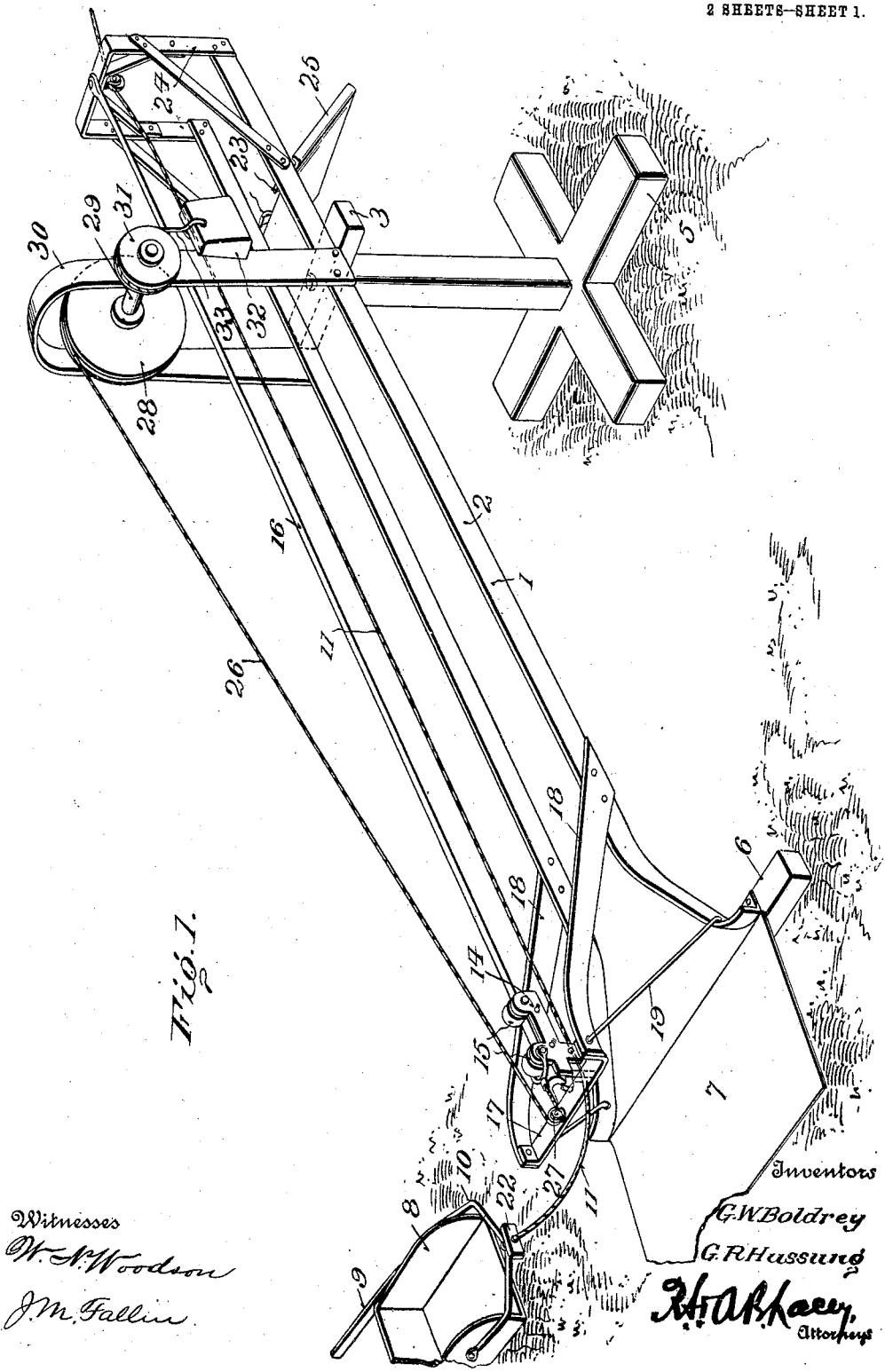

G. W. BOLDREY & G. R. HUSSUNG.
LOADING AND DUMPING APPARATUS.
APPLICATION FILED DEC. 10, 1909.
978,817.
Patented Dec. 13, 1910.
2 SHEETS—SHEET 2.
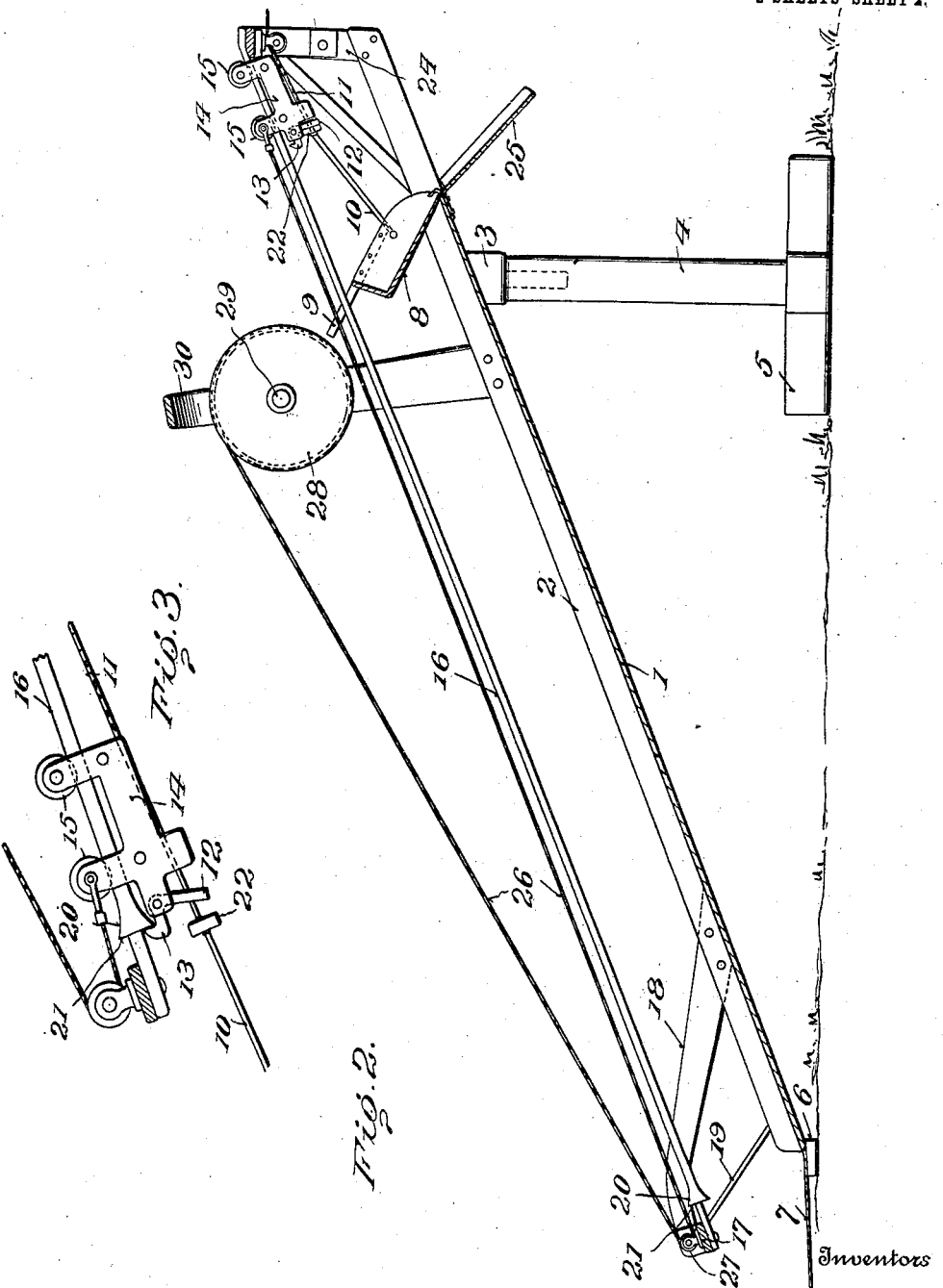
Witnesses
O. W. Woodson
J. M. Fallin
Inventors
G. W. Boldrey
G. R. Hussung
By R. H. A. Lacey, Attorneys

UNITED STATES PATENT OFFICE.

GEORGE W. BOLDREY AND GEORGE R. HUSSUNG, OF AURORA, INDIANA.

LOADING AND DUMPING APPARATUS.

978,817.  Specification of Letters Patent.  Patented Dec. 13, 1910.

Application filed December 10, 1909. Serial No. 532,378.

*To all whom it may concern:*

Be it known that we, GEORGE W. BOLDREY and GEORGE R. HUSSUNG, citizens of the United States, both residing at Aurora, in the county of Dearborn and State of Indiana, have invented certain new and useful Improvements in Loading and Dumping Apparatuses, of which the following is a specification.

This invention comprehends certain new and useful improvements in machines for loading gravel or other substance or materials, and the invention has for its primary object a simple, durable and efficient construction of apparatus of this character which may be operated within a wide radius to elevate the material and automatically dump the same into wagons, cars or other receptacles and which may be conveniently operated in places where it is necessary to draw the scraper or the like to the chute or run-way of the apparatus at an angle to the length of the run-way.

The invention consists, essentially, in a loading apparatus embodying an inclined chute or run-way for a scraper and a carriage movable on an inclined supporting rod mounted upon the run-way and extending above the same with a cable running through a trip arm suspended from the carriage and adapted to be secured to the bail of a scraper, in combination with means on the rod for engaging the carriage at the lower limit of its movement so that the scraper may be drawn toward the lower end of the run-way from positions at any side of the latter, the trip arm being released from the rod by a device carried by the bail of the scraper when the scraper is drawn up to the carriage and the lower end of the run-way, and the carriage and scraper being then drawn up the run-way until the upper end of the latter is reached. And the invention consists in certain constructions and arrangements of parts that we shall hereinafter fully describe and claim.

For a full understanding of the invention, reference is to be had to the following description and accompanying drawings in which:

Figure 1 is a perspective view of a loading and dumping apparatus constructed in accordance with our invention; Fig. 2 is a longitudinal sectional view thereof; and, Fig. 3 is a detail side view of the traveling carriage, illustrating it in locked position and ready to be released.

Corresponding and like parts are referred to in the following description and accompanying drawings by the same reference characters.

Our improved loading and dumping apparatus embodies an inclined run-way 1 which preferably is provided with sides 2 to properly guide the scraper as it is drawn up the run-way, said run-way being supported near its upper end on a transversely extending beam 3 which is pivotally mounted intermediate of its ends to turn in a substantially horizontal plane on a post or standard 4 which projects upwardly from a supporting base 5 of any desired construction. The lower end of the run-way 1 is preferably supported on a transversely extending beam 6 which is designed to be let into the ground, such as a gravel pit, level with the surface thereof.

Secured to the beam 6 and sloping forwardly therefrom is an apron 7 upon which the scraper 8 is intended to be first drawn as it is moved into or upon the run-way. The scraper may be of any desired construction or design and is preferably provided with handles 9 and with a pivoted bail 10. A cable (by which term a rope, chain, or equivalent device is included) designated 11 is connected at one end to the bail 10 and is passed through an opening formed for it in the lower or depending arm 12 of a bell crank latch 13 pivotally connected to a carriage 14. This carriage is provided at its upper end with rollers 15 by which it is suspended from and mounted to travel along an elevated rod or track 16 mounted above the run-way 1 and extending parallel therewith. At one end of the rod or track 16 and supporting it is a cross bar 17 the ends of which are secured to supporting arms 18 which are secured to the run-way 1 at opposite sides thereof and near the lower ends of the run-way and which are preferably braced by rods 19 as clearly illustrated in the drawing.

Secured to the carriage supporting rod or track 16 near the lower end thereof is an abutment 20 against which the carriage 14 is adapted to rest at the lower limit of its movement, the abutment being formed with a forwardly facing shoulder 21 designed to be engaged by the upper slightly hooked end of the latch 13 whereby to lock the carriage in its lowermost position and prevent the movement thereof along the track 16 upwardly and rearwardly.

The bail 10 of the scoop or scraper 8 is provided with a stop lug 22 which may be secured thereto or formed thereon at the point of connection of the cable 11 with the bail and which is intended to engage the downwardly extending arm 12 of the latch 13 when the scraper is moved up to the carriage, so as to release the carriage from its locking means and permit the carriage with the scraper attached thereto to be drawn up the run-way as the cable 11 is pulled upon. The cable 11 it is to be understood may be actuated by horses or be drawn up by any other power. Preferably, the run-way 1 is laterally flared at its lower end as indicated at 1ª so as to facilitate the entrance of the scraper 8.

The sides 2 of the runway 1 are continued rearwardly and upwardly beyond the bottom of the run-way as best illustrated in Fig. 1, and a supporting frame 24 is secured to and projects upwardly from the rear ends of the side extensions being braced in any desired way as shown, the cross bar of said frame supporting the rear or upper end of the carriage supporting rod or track 16.

At the upper edge of the bed of the run-way 1, stop lugs 23 are provided, the same being adapted for engagement by the forward edge of the scraper 8 as the same is drawn up the runway, whereby the continued pull upon the cable 11 will cause the scraper to tilt as illustrated in Fig. 2 and dump its load upon the discharge chute 25 which is secured to the upper end of the run-way and which is designed to direct the load into a wagon, car, or other receptacle placed underneath the run-way to receive it. In order to return the scraper to the bottom of the run-way after it has dumped its load and the cable 11 is released, we provide a returning cable 26 which is secured at one end to the carriage 14 and which passes around a pulley 27 mounted on the cross bar 17 at the lower end of the run-way. The other end of this cable extends around a wheel or drum 28 which is secured on a shaft 29 journaled in an arched frame 30, and a pulley 31 is secured to an outwardly projecting end of this shaft 29, a weight 32 being suspended from a cord, or rope 33 which is wound upon said pulley. It will thus be understood that when the cable 11 is released, the weight 32 the cable 33 of which has been wound upon the pulley 31 in the operation of drawing the scraper upon the run-way, will be permitted to act to turn the shaft 29 in a direction to pull upon the returning cable 26 and thus pull the carriage rearwardly along its supporting rod 16 and move the scraper down to the bottom of the run-way to receive another load.

From the foregoing description in connection with the accompanying drawings, the operation of our improved loading and dumping apparatus will be apparent.

In the practical use of the device, it will be understood that the scraper 8 is loaded in the usual manner, the carriage being at the lower limit of its movement and locked at such position by the engagement of its latch 13 with the shoulder or keeper 21 of the carriage supporting rod 16. After the scraper has been filled to the desired extent the cable 11 will be pulled upon to draw the scraper up the apron 7 and to the carriage 14, and as soon as the lug 22 of the scraper strikes the depending arm 12 of the latch, the latch will be automatically released from the scraper 2, and the continued pull upon the cable 11 will result in drawing the carriage and scraper up the run-way. As the scraper reaches the upper end of the run-way, the further movement of the cable will result in tilting the scraper to dump the same, owing to the engagement of the front edge of the scraper with the stop lugs 24 and the load will be deposited upon the discharge chute 25 by which it will be directed into the receptacle which is placed to receive it underneath the upper end of the run-way. Upon releasing the cable 11 the weight 32 will be permitted to act as just now described, to lower the carriage and scraper so that the latter may again be loaded for a subsequent operation.

It is obvious that under some conditions it is necessary to run the scraper up to the lower end of the run-way or chute in a direction say at right-angles to the length of the run-way. Under such circumstances, if no means were provided for holding the carriage at the lower end of the run-way until the scraper had reached the latter, the carriage would be drawn up the elevated rod 16 to a greater or less extent and consequently when the scraper reached the runway it would not be at the bottom thereof. It will be noted that by our invention this difficulty is avoided, as the carriage will be securely held in its lowermost position until the scraper had been drawn up to it, no matter in what direction the scraper is drawn over the ground toward the run-way.

Having thus described the invention, what is claimed as new is:

1. A loading and dumping apparatus, comprising a run-way, a carriage supporting track mounted in an elevated position above the run-way, a carriage mounted to run on the said track and suspended therefrom, the track being provided with a keeper, a latch secured to the carriage and provided with an arm adapted to engage the keeper and hold the carriage in one position, a scraper, a cable connected to said scraper and adapted to run through the latch and a lug movable with the cable and scraper and adapted to strike the lower arm of the latch whereby to release the same from the keeper.

2. A loading and dumping apparatus, comprising a run-way, a carriage supporting rod mounted in an elevated position above the run-way, a carriage suspended from and mounted to run along the rod, the rod being provided at one end with an abutment against which the carriage is adapted to rest in one position of the carriage, the abutment being formed with a forwardly facing shoulder, a bell crank latch carried by the carriage, the upper end of said latch being designed to engage the shoulder of said abutment, and a cable having a running connection with the latch, and a scraper provided with a bail secured to said cable and with a releasing lug adapted to contact with the latch and release the same from the shoulder.

3. A loading and dumping apparatus comprising a run-way, a track mounted in an elevated position above the run-way, a carriage adapted to move on said track and suspended therefrom, a scraper, a cable having a running connection with the carriage, and operatively connected to said scraper to draw the same and the carriage along the track, a returning cable connected to the carriage, a pulley at one end of the run-way and around which said returning cable extends and a counterweight operatively connected to said cable for the purpose specified.

4. A loading and dumping apparatus comprising a run-way, a track mounted in an elevated position above the run-way, a carriage suspended from and movable along the track, a scraper adapted to move along the run-way, a cable connected to said scraper and having a running connection with the carriage, a returning cable connected to the carriage, a pulley mounted at one end of the run-way and around which the returning cable extends, a wheel on which the returning cable is adapted to wind, a shaft to which said wheel is secured, a frame supporting said shaft, a pulley connected to said shaft and a weighted rope adapted to wind on said last named pulley as and for the purpose set forth.

5. A loading apparatus, comprising a run-way, a carriage supporting track mounted in an elevated position above the run-way, a carriage mounted to run on said track and suspended therefrom, a scraper, a cable connected to the scraper and having a running connection with the carriage, means for holding the carriage at one end of the track, and means for automatically releasing the carriage from the holding means upon the arrival of the scraper at the carriage.

In testimony whereof we affix our signatures in presence of two witnesses.

GEORGE W. BOLDREY. [L. S.]
GEORGE R. HUSSUNG. [L. S.]

Witnesses:
 ROBERT L. JOHNSTON,
 PAUL A. SMITH.